United States Patent
Yamauchi et al.

[11] Patent Number: 5,929,923
[45] Date of Patent: Jul. 27, 1999

[54] APPARATUS FOR PRODUCING A VIDEO SIGNAL IN SYNCHRONISM WITH AN EXTERNAL SYNCHRONIZING SIGNAL

[75] Inventors: Eiji Yamauchi, Katano; Kiyokazu Hashimoto, Matsubara; Tomoo Nakagawa, Katano, all of Japan

[73] Assignee: Matsushita Electric Industrial Co., Ltd., Osaka-fu, Japan

[21] Appl. No.: 08/740,458

[22] Filed: Oct. 29, 1996

[30] Foreign Application Priority Data

Oct. 31, 1995 [JP] Japan .................................. 7-282781

[51] Int. Cl.⁶ ....................................................... H04N 5/04
[52] U.S. Cl. ............................ 348/538; 348/547; 345/133
[58] Field of Search .................... 348/642, 513, 348/537, 538, 539, 517, 524, 536, 521, 510, 512, 514, 545, 516, 572, 720; 358/13

[56] References Cited

U.S. PATENT DOCUMENTS

| | | | |
|---|---|---|---|
| 4,438,456 | 3/1984 | Yoshinaka | 358/148 |
| 4,727,361 | 2/1988 | Tokumitsu | 340/703 |
| 5,008,740 | 4/1991 | Phillips et al. | 358/23 |
| 5,442,406 | 8/1995 | Altmanshofer et al. | 348/588 |
| 5,510,845 | 4/1996 | Yang et al. | 348/476 |
| 5,638,135 | 6/1997 | Mukai | 348/642 |
| 5,671,260 | 9/1997 | Yamauchi et al. | 348/500 |
| 5,686,968 | 11/1997 | Ujiie et al. | 348/521 |

FOREIGN PATENT DOCUMENTS 62-82773  4/1987  Japan .

*Primary Examiner*—John K. Peng
*Assistant Examiner*—D. C. Peter Chu
*Attorney, Agent, or Firm*—Panitch Schwarze Jacobs & Nadel, P.C.

[57] ABSTRACT

An encoder generating an analogue color signal is configured by a digital circuit. An external frame signal supplied from an external apparatus is counted by a clock pulse signal generated by a crystal oscillator, and a synchronizing signal to be added to the luminance signal is produced on the basis of a counted results, and all horizontal synchronizing periods of digital active lines are made identical, and in vertical blanking period, a predetermined horizontal synchronizing period is made variable.

3 Claims, 8 Drawing Sheets

APPARATUS FOR PRODUCING A VIDEO SIGNAL IN SYNCHRONISM WITH AN EXTERNAL SYNCHRONIZING SIGNAL

FIELD OF THE INVENTION AND RELATED ART STATEMENT

1. Field of the Invention

The present invention relates to a video signal processing apparatus which converts a digitalized video signal into an analogue video signal on the basis of an external synchronizing signal.

2. Description of the Related Art

Business-use digital video tape recorders are used in broadcasting stations. In the digital video tape recorder, digitalized video signals are recorded or reproduced. Furthermore, a video image-taking apparatus which records a digitalized video signal is marketed for consumers.

Digital video apparatus, particularly apparatus for business-use, includes functionality for outputting the video signal in synchronism with a synchronizing signal supplied from an external apparatus.

A conventional video signal processing apparatus is described hereafter.

FIG. 8 is a block diagram of the conventional video signal processing apparatus. Referring to FIG. 8, an input digital video signal Sin including a luminance signal Y and two color difference signals Cr and Cb are applied to a first input terminal 1. An external frame signal fsg of about 30 Hz is applied to a second input terminal 2. A phase-locked loop circuit 3 (hereinafter referred to as a PLL circuit) generates a first clock pulse signal clk 1, a second clock pulse signal clk 2 and an internal frame signal frp which are all synchronized with the external frame signal fsg applied to the second input terminal 2. A write control circuit 4 generates a write control signal CW in order to write the digital video signal Sin in a memory 5 on the basis of the external frame signal fsg and the clock pulse signal clk 1. A readout control circuit 6 generates a readout control signal CR in order to read out a digital video signal Sout from the memory 5 on the basis of the clock pulse signal clk 2 and the internal frame signal frp. A synchronizing signal generator 7 generates a synchronizing signal cpsync which is added to an output video signal Senc on the basis of the clock pulse signal clk 2 and the internal frame signal frp. An encoder 8 adds the synchronizing signal cpsync to the luminance signal Y in the digital video signal Sout supplied from the memory 5, and, converting the result to an analogue signal. Furthermore the encoder 8 converts the color difference signals Cr and Cb in the digital video signal Sout to analogue signals, and converting the result to a color signal. Conversion of the color difference signals Cr and Cb to the color signal is called "modulation". The modulation is described in detail later.

Operation of the conventional video signal processing apparatus configured above is described hereafter.

The external frame signal fsg of about 30 Hz inputted to the second input terminal 2 is applied to the PLL circuit 3. The PLL circuit 3 generates a clock pulse signal of 54 MHz in synchronism with the external frame signal fsg, and divides this clock pulse signal. Subsequently, the PLL circuit 3 outputs the clock pulse signal clk 1 of 18 MHz, the clock pulse signal clk 2 of 13.5 MHz and the internal frame signal frp of about 30 Hz. The write control circuit 4 generates the write control signal CW on the basis of the external frame signal fsg and the clock pulse signal clk 1 supplied from the PLL circuit 3. The write control circuit 4 stores the digital video signal Sin including the luminance signal Y and the color difference signals Cr and Cb in the memory 5 by using the write control signal CW.

The digital video signal Sout is read out of the memory 5 by the readout control signal CR of the readout control circuit 6. The digital video signal Sout comprises the luminance signal Y and two color difference signals Cr and Cb which are adjusted of timings synchronizing with the output video signal Senc. The synchronizing signal generator 7 receives the clock pulse signal clk 2 and the internal frame signal frp, and generates the synchronizing signal cpsync including a horizontal synchronizing signal, a vertical equalization pulse, a vertical synchronizing signal and a vertical blanking signal. The synchronizing signal cpsync is applied to the encoder 8. The synchronizing signal cpsync is synchronized with the external frame signal fsg. The synchronizing signal cpsync supplied from the synchronizing signal generator 7 is added to the luminance signal Y of the digital video signal Sout supplied from the memory 5 by the encoder 8. Subsequently, the encoder 8 converts the luminance signal Y into an analogue luminance signal Ya, which is output to an output terminal 9. Simultaneously, the encoder 8 converts the color difference signals Cr and Cb supplied from the memory 5 into respective analogue color difference signals.

Subsequently, the above-mentioned "modulation" is carried out in a manner described below. In the modulation, two analogue color difference signals are multiplied by a first color carrier signal of 3.579545 MHz and a second color carrier signal which has the same frequency as and 90 degrees of phase difference from the first color carrier signal, respectively. The first and second color carrier signals are generated by a crystal oscillator included in the encoder 8. Multiplied results are added and a color signal Ca is produced. The analogue luminance signal Ya and the color signal Ca produced by the encoder 8 are output to the output terminal 9.

In the above-mentioned conventional art, modulation of the color difference signals Cr and Cb is carried out after converting the color difference signals Cr and Cb to respective analogue signals. Therefore, analogue circuits such as a crystal oscillator for oscillating the color carrier signal, multipliers and an adder must be provided in the encoder 8. Consequently, circuit configuration is complicated, and it is difficult to keep stability with respect to variations of temperature and power source voltage. Moreover, the digital video signal including the luminance signal Y and the color difference signals Cr and Cb is sampled by a sampling frequency of 13.5 MHz. Therefore, beat disturbance is likely to occur between respective harmonics of 13.5 MHz the sampling frequency and 3.579545 MHZ the first color carrier signal, and liable to cause deterioration of the video signal.

OBJECT OF THE SUMMARY OF THE INVENTION

An object of the present invention is to provide the video signal processing apparatus having superior stability, by configuring an encoder generating a color signal with a digital circuit.

Another object of the present invention is to provide the video signal processing apparatus which is capable of adding a stable synchronizing signal to the luminance signal.

In the present invention, an encoder circuit which converts color difference signals to a color signal is configured in a digital circuit using a first clock pulse signal of a stable frequency. A period of an external frame signal supplied from an external apparatus is measured by using the first pulse signal, and the number of clock pulses of one scanning line of an output video signal is decided on the basis of a measured value. A synchronizing signal is generated in a manner that the number of clock pulses of one "digital active line" is identical with each other in all digital active lines. Term of "digital active line" is used in the digital video apparatus and corresponds to "effective scanning line" in analogue video apparatus. Subsequently, the synchronizing signal is added to the luminance signal.

Furthermore, in the present invention, the encoder circuit converting the color difference signal to the color signal is configured by a digital circuit using the first clock pulse signal of the stable frequency. Moreover, a second clock pulse signal which synchronizes with the external frame signal supplied from the external apparatus is generated by a PLL circuit. A synchronizing signal generator generates the synchronizing signal in a manner that the number of clock pulses of one digital active line is a predetermined constant number of the second clock pulse signals. The synchronizing signal is added to the luminance signal. Furthermore, timings of the color signal and the luminance signal are changed by an interpolation circuit.

Since all circuits generating the luminance signal and the color difference signal are configured as digital circuits, the video signal processing apparatus is stably operated without problems of change with the passage of time, temperature change and change of power supply voltage. Additionally, processings of the luminance signal and the color difference signals and digital-to-analogue conversion are carried out on the basis of the same clock pulse signal, and therefore generation of the beat disturbance is prevented.

DESCRIPTION OF THE PREFERRED EMBODIMENTS

The present invention will be described in detail below with reference to the according drawings.
[First embodiment]

A first embodiment of the present invention is described with reference to FIG. 1 to FIG. 5.

Figure 1:
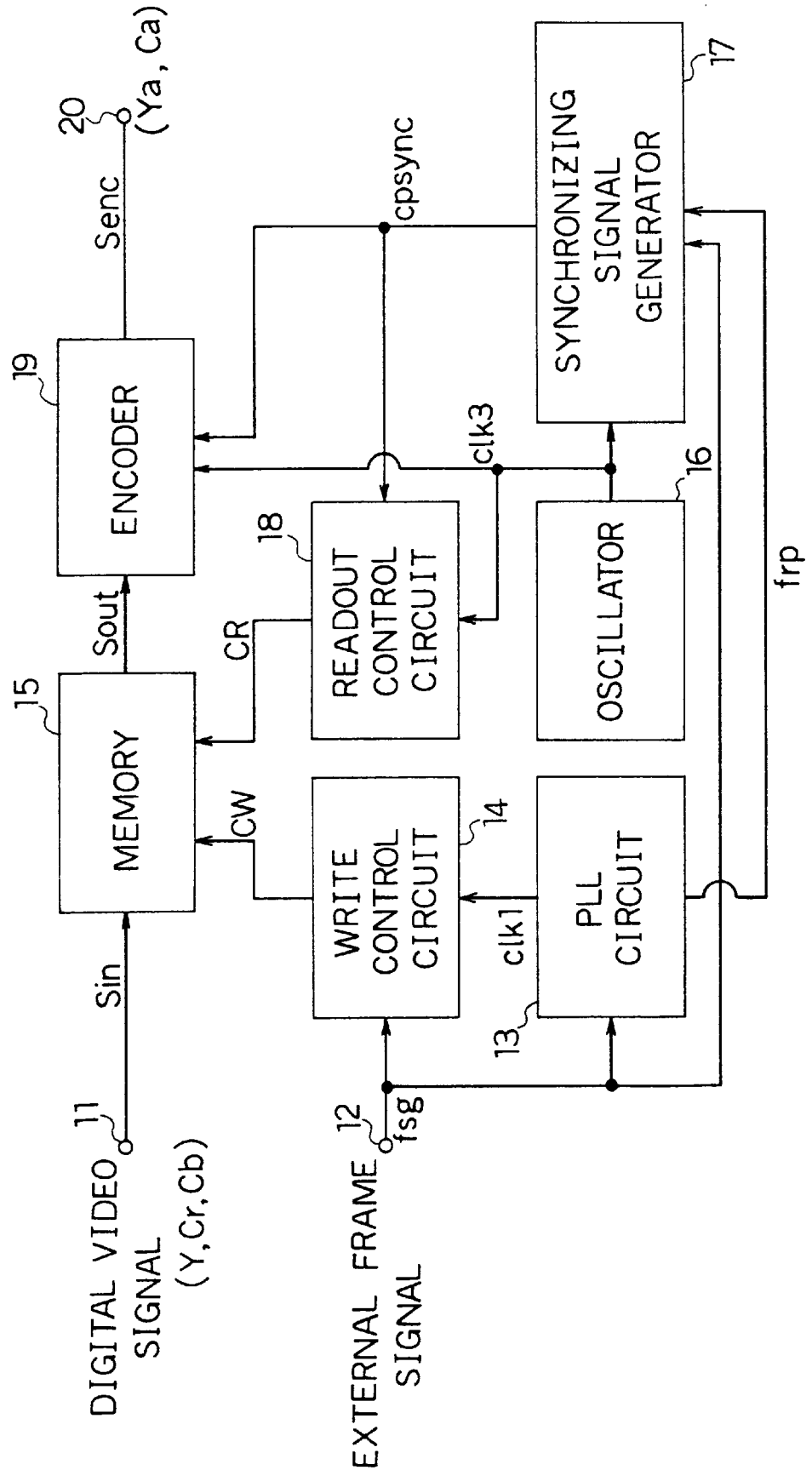
FIG. 1 is a block diagram of the video signal processing apparatus in a first embodiment of the present invention.

FIG. 1 is a block diagram of a video image processing apparatus in the first embodiment of the present invention. A digital video signal to be processed by the video signal processing apparatus of the present invention conforms with the standard of "RECOMMENDATION 601-1" of Comite Consultatif International des Radiocommunications. According to the "RECOMMENDATION 601-1", the luminance signal Y of the digital video signal is converted into 0 to 255 quantization levels of 8 bits, and has 220 quantization levels with the black level corresponding to level 16 and the peak white level corresponding to level 235. Two color difference signals Cr and Cb are also converted into 0 to 255 quantization levels of 8 bits, respectively, and each of color difference signals Cr and Cb has 225 quantization levels of signal range in the center part of the quantization scale (0 to 255) with 0 signal corresponding to level 128.

Referring to FIG. 1, a digital video signal Sin is inputted to a first input terminal 11. An external frame signal fsg of about 30 Hz is applied to a second input terminal 12 as an external synchronizing signal. A phase-locked loop circuit 13 (hereinafter is referred to as PLL circuit) generates a first clock pulse signal clk1 and an internal frame signal frp which are synchronized with the external frame signal fsg. A write control circuit 14 generates a write control signal CW in order to write the video signal Sin in a memory 15 on the basis of the external frame signal fsg and the clock pulse signal clk1. An oscillator 16 has a crystal oscillator, and outputs a clock pulse signal clk3 of 27 MHz. An error of the frequency of the clock pulse signal clk3 is a plus or minus several ten ppm and below (ppm : part per million). The clock pulse signals clk1 and clk3 are pulse signals, and hereinafter the number of the pulses of this signals is referred to as "the number of clock pulses".

The synchronizing signal generator 17 detects the number of clock pulses of the clock pulse signal clk3 in one period of the frame signal fsg, and produces a synchronizing signal cpsync to be added to an output analogue video signal Senc, from a detected value. The obtained synchronizing signal cpsync is applied to an encoder 19. A readout control circuit 18 produces a readout control signal CR in order to read out a digital video signal Sout from the memory 15 on the basis of the clock pulse signal clk3 and the synchronizing signal cpsync. An encoder 19 adds the synchronizing signal cpsync to the luminance signal Y in the digital video signal Sout which is supplied from the memory 15, and produces an analogue luminance signal Ya. Moreover, the encoder 19 modulates two color difference signals Cr and Cb to a color signal by using the clock pulse signal clk3, and after then the color signal is converted to an analogue color signal Ca. An analogue video signal Senc including the analogue luminance signal Ya and the analogue color signal Ca is output to an output terminal 20 from the encoder 19.

Figure 2:
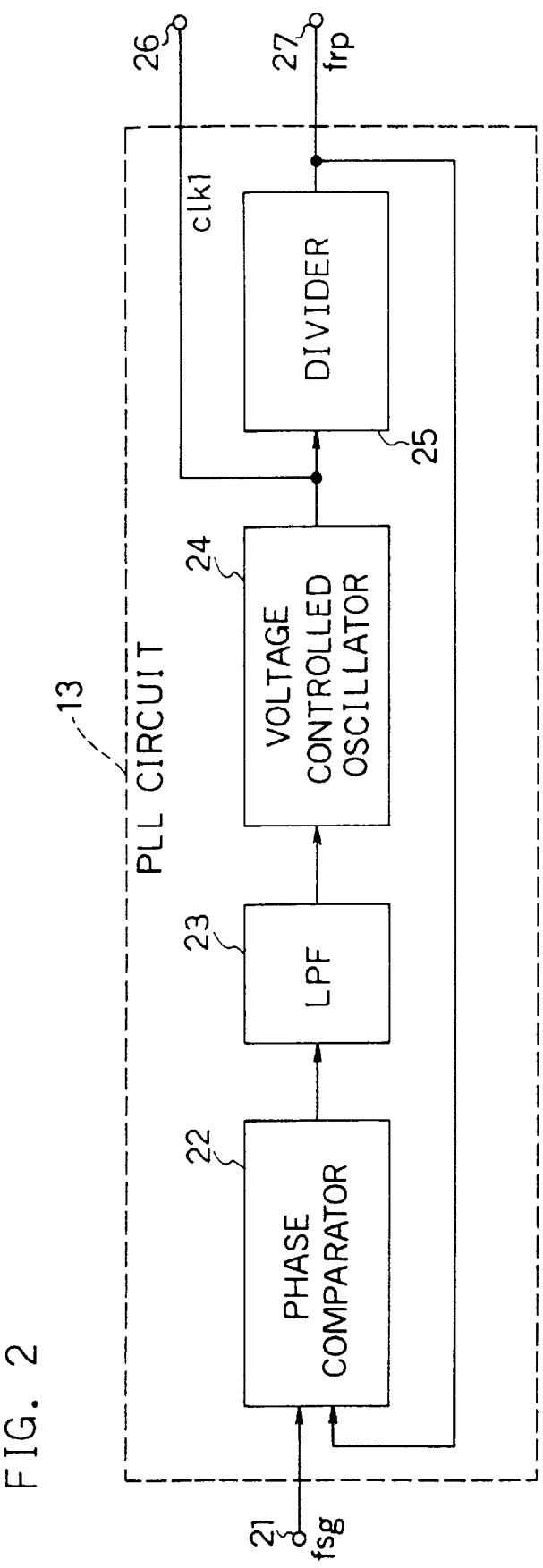
FIG. 2 is a block diagram of a PLL circuit 13 in the video signal processing apparatus of the first embodiment.

FIG. 2 is a block diagram of the PLL circuit 13. Referring to FIG. 2, the external frame signal fsg is applied to a third input terminal 21. A phase comparator 22 detects a phase difference between the external frame signal fsg and the internal frame signal frp. The output of the phase comparator 22 is applied to a low pass filter 23 (hereinafter is referred to as LPF). The output of LPF 23 is applied to a voltage-controlled oscillator 24. The voltage-controlled oscillator 24 outputs to a divider 25 the clock pulse signal clk1 of 18 MHz which synchronizes with the external frame signal fsg. The divider 25 divides the frequency of the clock pulse signal clk by 600600, and generates the internal frame signal of frequency frp. The clock pulse signal clk1 is output to a second output terminal 26 from the voltage-controlled oscillator 24. The internal frame signal frp is output to a third output terminal 27 from the divider 25. The third input terminal 21 is connected to the second input terminal 12 in FIG. 1; the second output terminal 26 is connected to the write control circuit 14; and the third output terminal 27 is connected the synchronizing signal generator 17.

Figure 3:
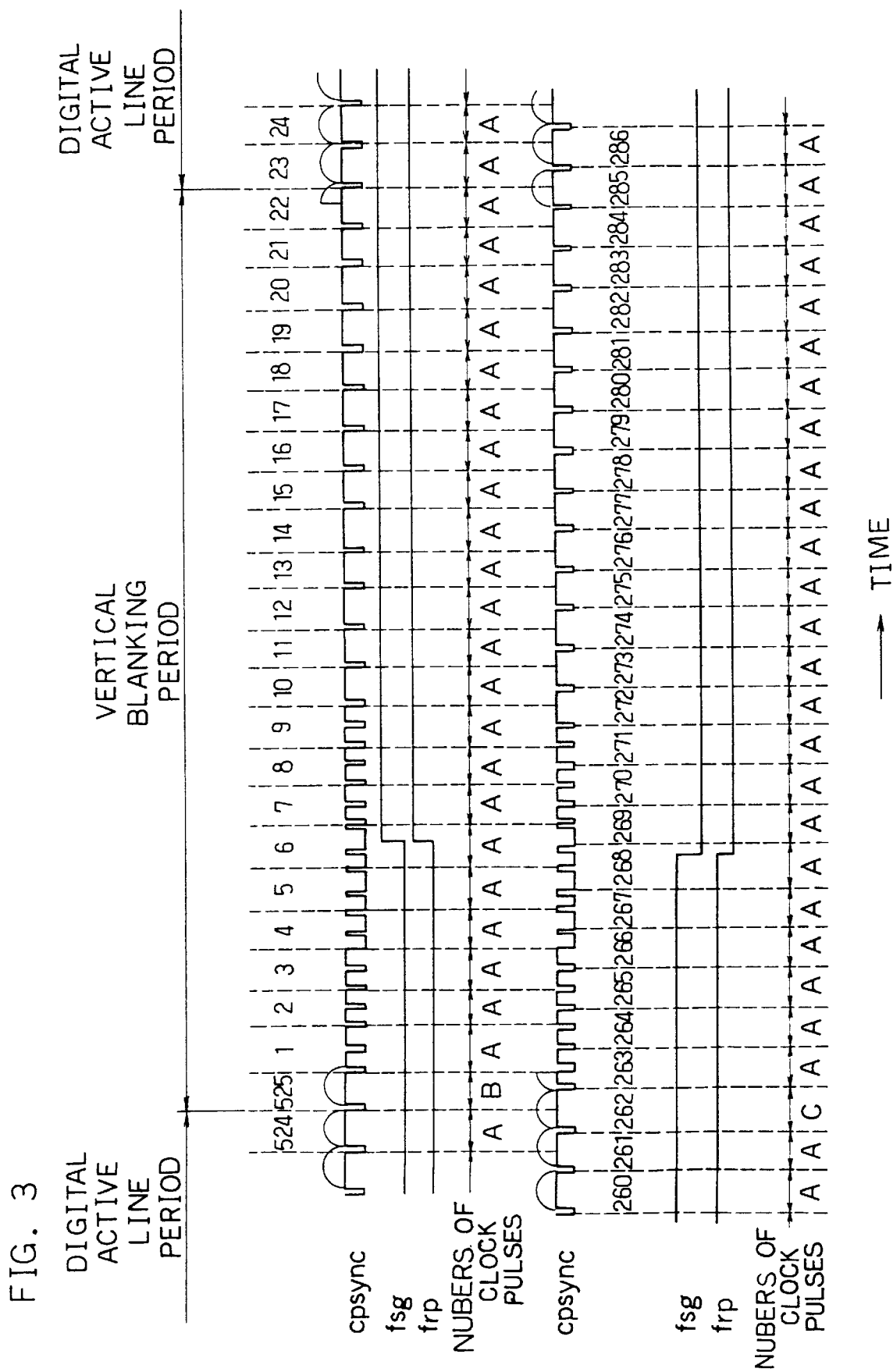
FIG. 3 is a timing chart of signals in the video signal processing apparatus of the first embodiment.
Figure 4:
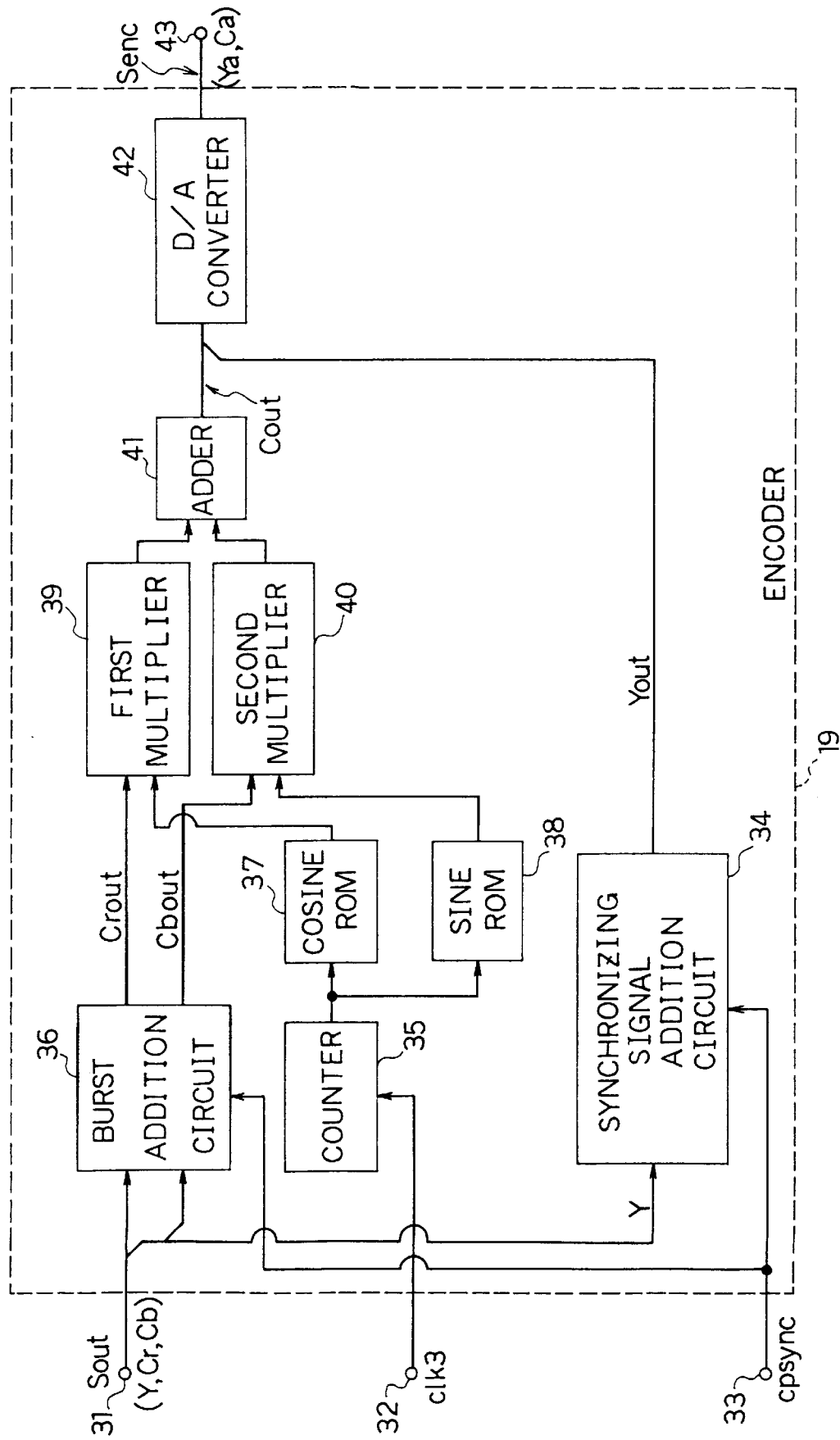
FIG. 4 is a block diagram of an encoder 19 in the video signal processing apparatus of the present invention.

FIG. 3 is a timing chart showing operation of the synchronizing signal generator 17 and FIG. 4 is a block diagram of the encoder 19.

Referring to FIG. 4, the digital video signal Sout read out of the memory 15 is applied to a fourth input terminal 31 of the encoder 19, and the clock pulse signal clk3 is applied to a fifth input terminal 32. The synchronizing signal cpsync is applied to a sixth input terminal 33. A synchronizing signal addition circuit 34 superposes the synchronizing signal cpsync on the luminance signal Y included in the digital video signal Sout. A counter 35 counts up the clock pulse of the clock pulse signal clk3. A burst addition circuit 36 detects a position at which a burst signal is added in each color difference signal, on the basis of the synchronizing signal cpsync, and the value of each color difference signal at the detected position is adjusted to a predetermined value. A color difference signal Crout output from the burst addition circuit 36 is applied to a first multiplier 39, and a color difference signal Cbout is applied to a second multiplier 40.

A cosine ROM 37 stores a predetermined number of sample values of a first color carrier signal. Moreover, a sine ROM stores a predetermined number of sample values of a second color carrier signal which has the same frequency as that of and 90 degrees of phase difference from that of the first color carrier signal. The first multiplier 39 multiplies the color difference signal Crout by the sample values stored in the cosine ROM 37, and the second multiplier 40 multiplies the color difference signal Cbout by the sample values stored in the sine ROM 38. Subsequently, both outputs of the multipliers 39 and 40 are added by an adder 41.

A digital-to-analogue converter 42 (hereinafter is referred to as D/A converter) converts the output signal Cout of the adder 41 and the output signal Yout of the synchronizing signal addition circuit 34 into an analogue signal Senc. The analogue signal Senc of the D/A converter 42 is output to a fourth output terminal 43. The fourth input terminal 31 is connected to the memory 15, and the fifth input terminal 32 is connected to the oscillator 16. The sixth input terminal 33 is connected to the synchronizing signal generator 17, and the fourth output terminal 43 is connected to the first output terminal 20.

Operation of the video signal processing apparatus of the first embodiment configured above is described in detail hereafter with reference to FIG. 2 and FIG. 3.

The external frame signal fsg of about 30 Hz inputted to the second input terminal 12 is applied to the PLL circuit 13. In the PLL circuit 13, a rise edge of the external frame signal fsg is compared with a rise edge of the internal frame signal frp output from the divider 25 by the phase comparator 22. The phase comparator 22 outputs a signal representing a phase difference of comparison result to the LPF 23. A high frequency component of the output signal of the phase comparator 22 is eliminated by the LPF 23. The output of the LPF 23 is applied to the voltage-controlled oscillator 24. Consequently, the voltage-controlled oscillator 24 outputs the clock pulse signal clk1 of 18 MHz to the second output terminal 26 and the divider 25 in synchronism with the external frame signal fsg.

The divider 25 divides the frequency of the clock pulse signal clk1 by 600600, and produces the internal frame signal frp of 50% of duty ratio. The clock pulse signal clk1 is output to the phase comparator 22 and the third output terminal 27. Waveforms of the external frame signal fsg and the internal frame signal frp are shown in FIG. 3. As shown in FIG. 3, the timings of the rise edge and fall edge of the internal frame signal frp are substantially coincident with the timings of rise edge and fall edge of the external frame signal fsg, respectively.

The write control circuit 14 produces the write control signal CW of the memory 5 on the basis of the external frame signal fsg inputted to the second input terminal 12 and the clock pulse signal clk1 supplied from the PLL circuit 13. The write control circuit 14 stores into the memory 15 the digital video signal Sin including the luminance signal Y and two color difference signals Cr and Cb on the basis of the write control signal CW.

The oscillator 16 comprises crystal oscillation element, and outputs the clock pulse signal clk3 of 27 MHz which is very stable in frequency, for example, with a frequency error of 30 ppm and below. The synchronizing signal generator 17 measures one period of external frame signal fsg by using the clock pulse signal clk3 supplied from the oscillator 16. In actual operation, an internal counter is reset by a rise edge of the external frame signal fsg, and a counted value of the internal counter increases by "+1" every rise edge of the clock pulse signal clk3. Subsequently, the counted value "N" of the internal counter is stored in a register at the rise edge of the next external frame signal fsg. The period of external frame signal fsg is not constant but varies. Therefore, the counted value "N" varies.

An example of operation of the synchronizing signal generator 17 is described hereafter in detail. Let us provide that number of clock pulses of the clock pulse signal clk 3 in one period of the external frame signal fsg is "N". In the synchronizing signal generator 17, N is divided by 525 (number of scanning lines in the NTSC standard) as shown by equation (1), and the quotient (A) and the remainder (G) are derived.

$$N \div 525 = A(\text{quotient}) \ldots G(\text{remainder}) \ldots \quad (1)$$

The remainder G is larger than −262 and smaller than 263 (−262<G<263).

The number of clock pulses in each horizontal synchronization period of the scanning lines except five hundred and twenty-fifth and two hundred and sixty-second scanning lines in the vertical blanking period is set equally to the quotient (A). When the number of clock pulses of the five hundred and twenty fifth scanning line is represented by "B", and the number of clock pulses of the two hundred and sixty second scanning line is represented by "C", the remainder G is divided into two parts, namely, number D and number E as follows:

$$G = D + E.$$

When G is even number, D=E.
When G is odd number, D=E+1.

The number (B) is the sum of the quotient (A) and the number (D) (B=A+D), and the number (C) is the sum of the quotient (A) and the number (E) (C=A+E).

Arrangements of the numbers A, B and C of clock pulses in one frame is shown in FIG. 3. Referring to FIG. 3, the number of clock pulses of the five hundred and twenty fifth scanning line is B, and the number of clock pulses of two hundred and sixty second scanning line is C. The number of clock pulses of all digital active lines in a digital active line period is A. The maximum difference between number A of clock pulses and the number B of clock pulses is 132. Therefore, skew arises in the five hundred and twenty fifth scanning line due to the difference of the number of clock pulses. Since the time length of 132 clock pulses corresponds to 4.89 $\mu$s when the clock pulse signal clk3 is 27 MHz, the skew of 4.89 $\mu$s is liable to arise in the vertical blanking period. However, the skew of 4.89 $\mu$s is a relatively small variation which can be followed by step response of a television receiver. Therefore, the digital active lines after the vertical blanking period are not influenced.

In the synchronizing signal generator 17, the number of clock pulses of all digital active lines are made equal to each other as mentioned above. If there is a variation of one clock pulse at timing of the horizontal synchronizing signal in the digital active lines, the television receiver can not follow the variation. Consequently, horizontal position of a video signal shifts between two digital active lines having different numbers of clock pulses, and image quality deteriorates.

As another method deciding the numbers A, B and C of clock pulses, the above-mentioned quotient (A) is calculated in several frame periods to several ten frame periods, and an average value of the calculated values is derived. This process is called "filter processing". By the filter processing, the skew is smoothed, and stability of video image is further improved.

In the synchronizing signal generator 17, the internal frame signal frp supplied from the PLL circuit 13 is set to a starting point of operation, and the synchronizing signal cpsync of the video signal is produced on the basis of above-mentioned calculation results. Relation between the synchronizing signal cpsync and the internal frame signal frp is shown in FIG. 3.

Referring to FIG. 1, the readout control circuit 18 generates the readout control signal Cr on the basis of the clock pulse signal clk3 supplied from the oscillator 16 and the synchronizing signal cpsync supplied from the synchronizing signal generator 17. The digital video signal Sout including the luminance signal Y and two color difference signals Cr and Cb is read out of the memory 15 by the readout control signal CR supplied from the readout control circuit 18. In the readout operation, the digital video signal Sout is arranged in data arrangement of the output analogue video signal Senc, and the timings thereof are adjusted. Jitter between the external frame signal fsg and the internal frame signal frp is eliminated through the memory 15. Deshuffling or frequency conversion of the video signal of one frame can be carried out through the memory 15.

The digital video signal Sout read out of the memory 15 is applied to the encoder 19. Configuration of the encoder 19 is shown in FIG. 4. The digital video signal Sout applied to the fourth input terminal 31 is separated to the luminance signal Y and the color difference signals Cr and Cb. The luminance signal Y is applied to the synchronizing signal addition circuit 34. Two color difference signals Cr and Cb are applied to the burst addition circuit 36. Simultaneously, the clock pulse signal clk3 inputted to the fifth input terminal 32 is applied to a counter 35. A counted value of the counter 35 increases by one every rise edge of the clock pulse signal clk3 within a predetermined range. The output signal of the counter 35 is applied to a cosine ROM 37 and a sine ROM 38 as respective addresses. Consequently, data of two color carrier signals which are different in phase by 90° from each other are output from the cosine ROM 37 and sine ROM 38.

Figure 5:
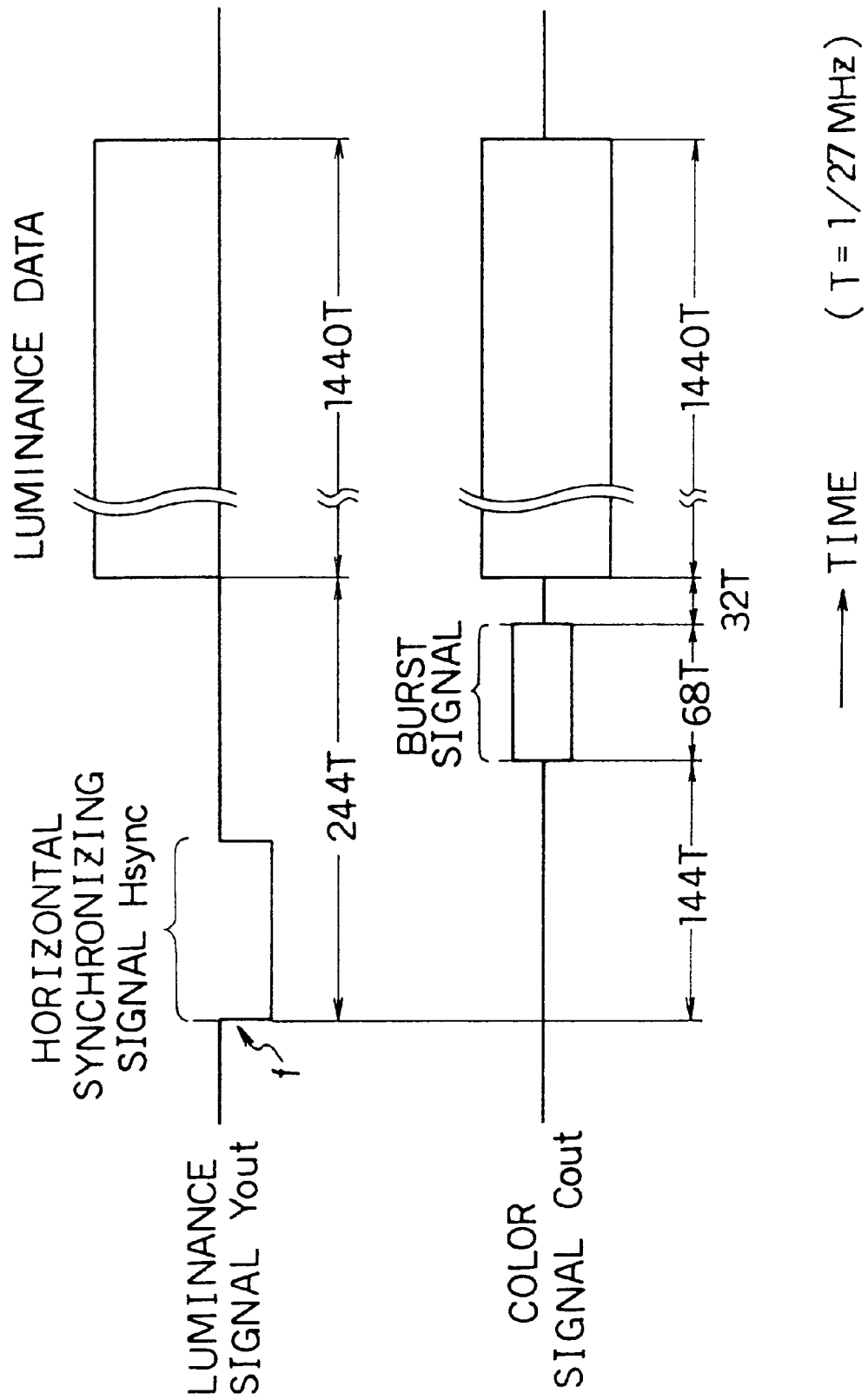
FIG. 5 is a timing chart of a video signal output from the video signal processing apparatus of the present invention.

As shown in FIG. 5, the burst addition circuit 36 inserts a burst signal in the color difference signals Cr and Cb in the period of 68T (T=1/27 MHz) after period 144T of fall edge f of a horizontal synchronizing signal Hsync included in the synchronizing signal cpsync. Therefore, the value of the color difference signal Cr is changed to level "128", and the value of the color difference signal Cb is changed to level "51". In the burst addition circuit 36, except the above-mentioned period of 68T, inputted color difference signals Cr and Cb are transmitted without any processing.

In FIG. 4, a color difference signal Crout output from the burst addition circuit 36 is multiplied by the output of the cosine ROM 37 in the first multiplier 39. The color difference signal Cbout is multiplied by the output of the sine ROM 38 in the second multiplier 40. The output signals of the first and second multipliers 39 and 40 are added to each other in the adder 41, and a resultant output signal Cout is applied to the D/A converter 42. The output signal Cout is converted to an analogue color signal Ca by the D/A converter 42.

The synchronizing signal addition circuit 34 adds the horizontal synchronizing signal cpsync to the luminance signal Y. Relation of the timings of the luminance signal Y and the horizontal synchronizing signal cpsync is shown in FIG. 5. Luminance data is inserted in the period of 1440T after period 244T from the fall edge f of the horizontal synchronizing signal cpsync. In FIG. 4, the luminance signal Sout output from the synchronizing signal addition circuit 34 is applied to the D/A converter 42. The D/A converter 42 converts the luminance signal Sout into an analogue luminance signal Ya, which is output to the fourth output terminal 43.

Consequently, the analogue video signal Senc including the analogue luminance signal Ya and analogue color signal Ca is output to terminal 20 from the encoder 19 shown in FIG. 1. The color signal Ca is generated by using the clock pulse signal clk 3. Therefore, the burst signal included in the color signal Ca keeps very high accuracy of frequency.

In the first embodiment, the period of the external frame signal fsg is measured by using the clock pulse signal clk 3 in the synchronizing signal generator 17. A similar effects is obtained by measuring the period of the internal frame signal frp which is synchronized with the external frame signal fsg by the PLL circuit 13.

In the above-mentioned operation, the frequency of 27 MHz is selected as the clock pulse signal clk 3, but other frequency may be selected. Though the external frame signal fsg is a binary signal having a high level and a low level of about 30 Hz, numeral data counted by a clock pulse signal of a predetermined frequency can be applied. For example, in the case that the digital video signal Sin is transmitted by packet communication, the external frame signal fsg is counted with a clock pulse signal of a predetermined stable frequency in a transmission side, and the counted value is transmitted together with the digital video signal.

In the above-mentioned operation, the five hundred and twenty-fifth scanning line and two hundred and sixty-second scanning line in the vertical blanking period are set to the numbers B and C of clock pulses, respectively, which are different from the number A. The number B or C of clock pulses may be divided and is distributed to plural scanning lines.

[Second embodiment]

Figure 6:
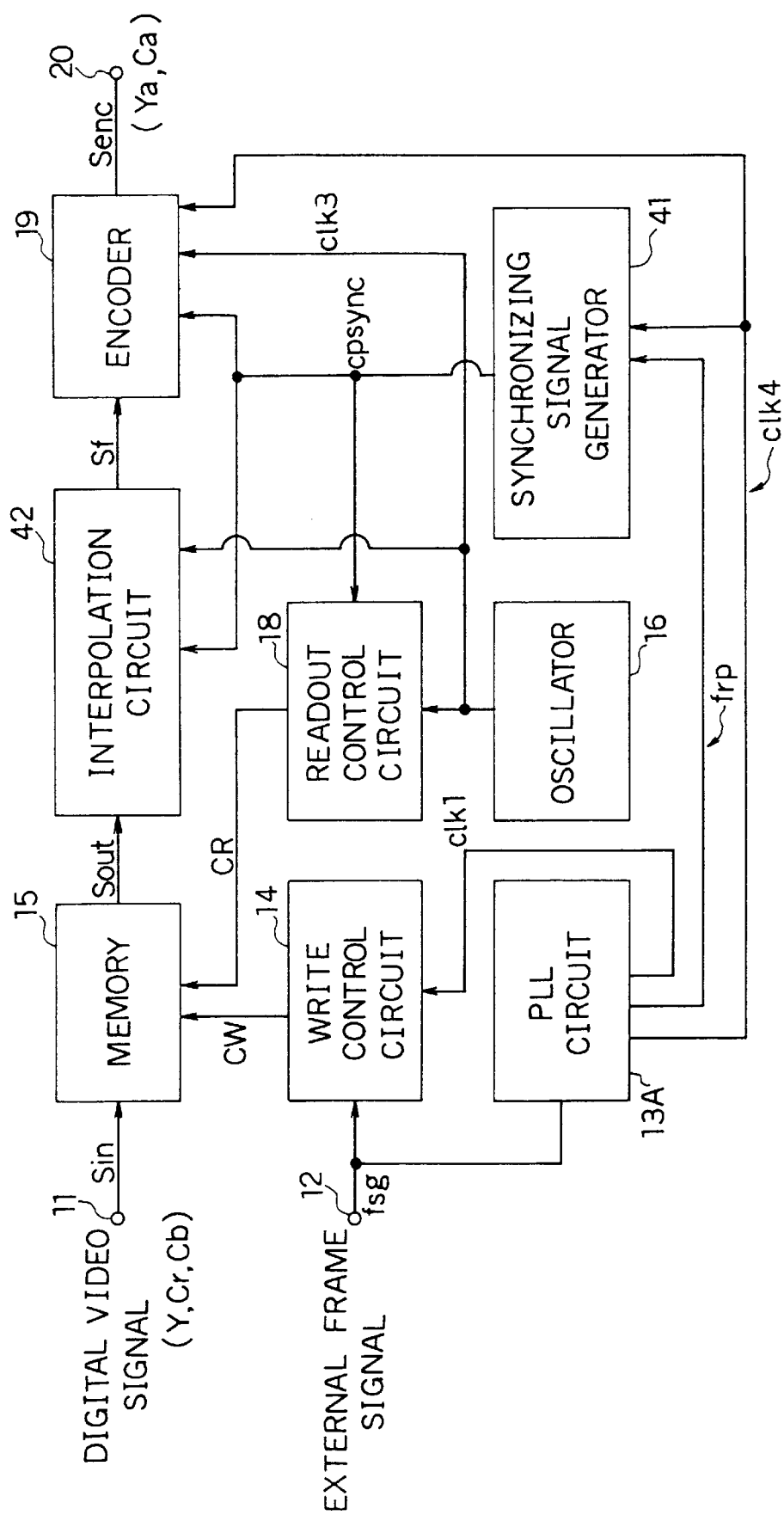
FIG. 6 is a block diagram of the video signal processing apparatus in a second embodiment of the present invention.
Figure 7:
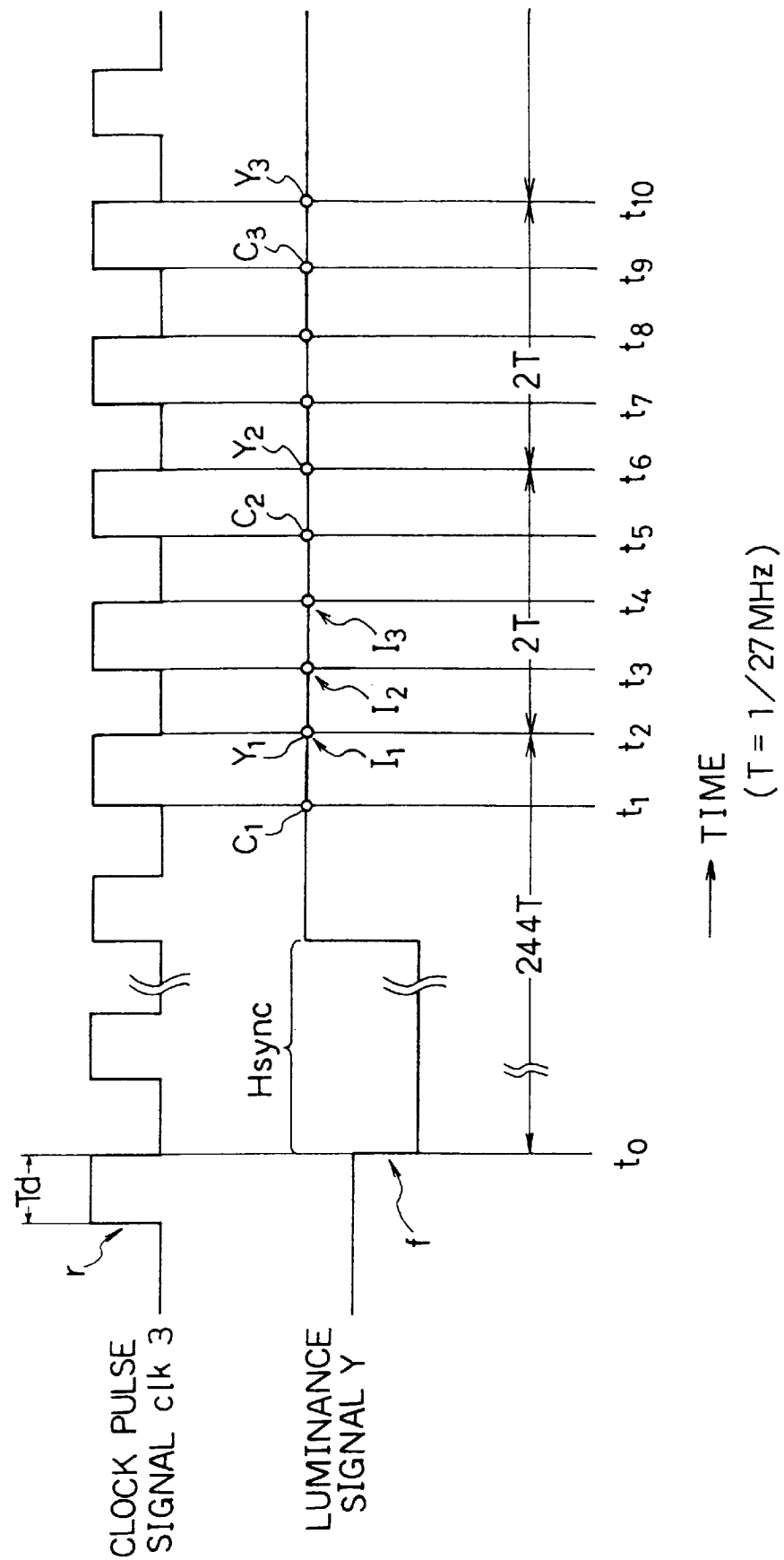
FIG. 7 is a timing chart of operation of an interpolation circuit in the video signal processing apparatus of the second embodiment.
Figure 8:
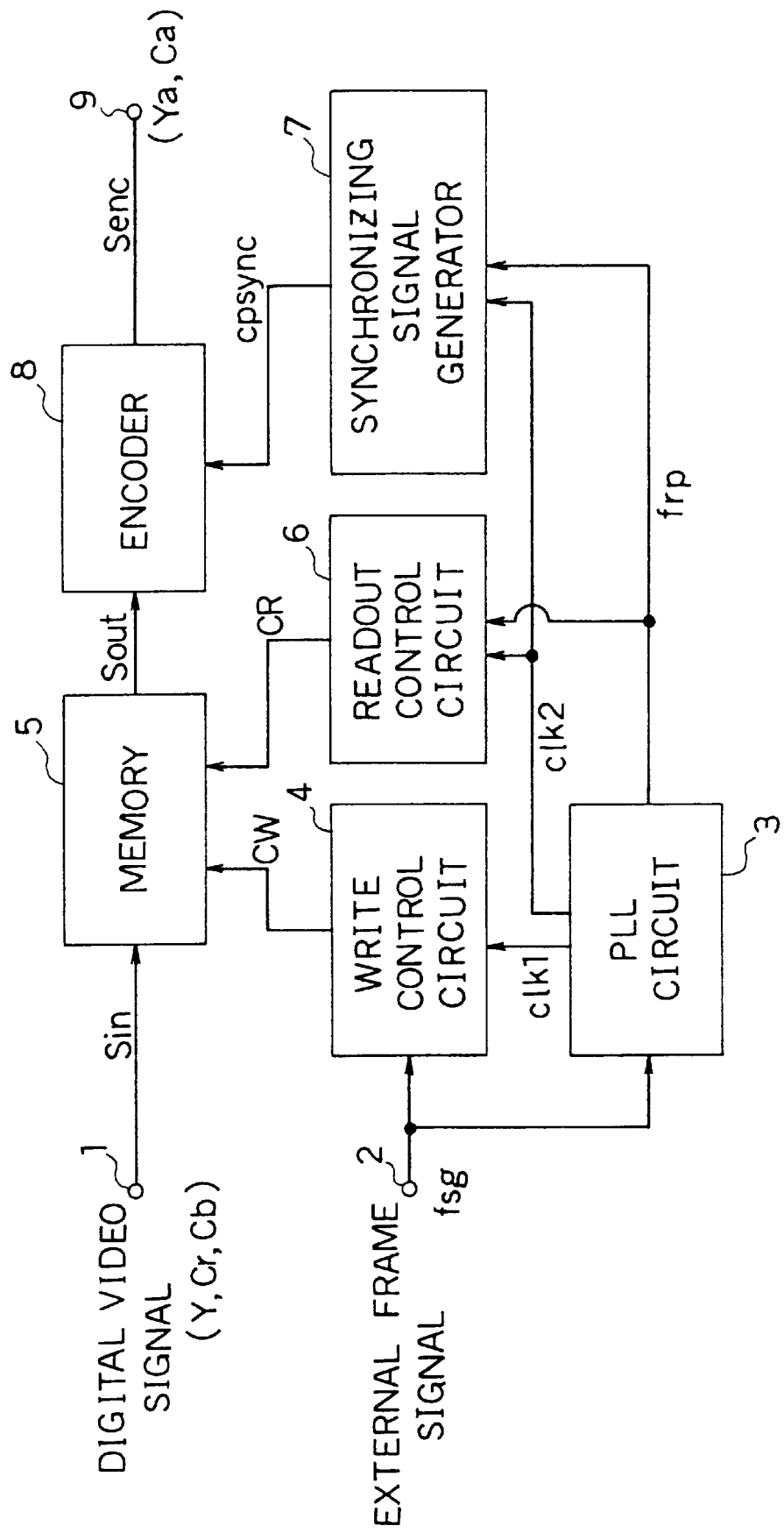
FIG. 8 is the block diagram of the video signal processing apparatus in the conventional art.

A second embodiment of the present invention is described hereafter with reference to FIG. 6 and FIG. 7. FIG. 6 is a block diagram of the video signal processing apparatus of the second embodiment of the present invention. Referring to FIG. 6, the digital video signal Sin including the luminance signal Y and two color difference signals Cr and Cb is inputted to the first input terminal 11. The external frame signal fsg of about 30 Hz is inputted to the second input terminal 12. A PLL circuit 13A generates the clock pulse signal clk 1, the internal frame signal frp and a clock pulse signal clk 4 of 27 MHz which are synchronized with the external frame signal fsg inputted to the second input terminal 12. Configurations of the write control circuit 14, the readout control circuit 18 and the memory 15 are similar to those in the first embodiment shown in FIG. 1, and therefore, description is omitted. The oscillator 16 outputs the clock pulse signal clk 3 of 27 MHz which has a frequency error of plus or minus several ten ppm and below. The synchronizing signal generator 41 receives the internal frame signal frp and the clock pulse signal clk 4, and generates the synchronizing signal cpsync so that the number of clock pulses of all scanning lines (digital active lines and scanning lines in vertical blanking period) is always constant.

The digital video signal Sout output from the memory 15 is applied to an interpolation circuit 42. The interpolation circuit 42 comprises a digital filter (not shown). In the interpolation circuit 42, a phase difference between the synchronizing signal cpsync and the clock pulse signal clk 3 is detected, and interpolation data which is described later in detail is produced from data of the digital video signal Sout on the basis of the phase difference. A video signal Sf is generated on the basis of the interpolation data, and is output to the encoder 19. The encoder 19 adds the synchronizing signal cpsync supplied from the synchronizing signal generator 41 to the digital luminance signal Y in the video signal Sf, and converts to the analogue luminance signal Ya. Simultaneously, the encoder 19 modulates the digital color difference signals Cr and Cb in the video signal Sf by using the clock pulse signal clk 3, and generates a color signal. After then, the color signal is converted to the analogue color signal Ca. The analogue video signal senc including the analogue luminance signal Ya and the analogue color signal Ca are output to the output terminal 20.

Operation of the video signal processing apparatus of the second embodiment is described hereafter in detail.

Difference of the second embodiment from the first embodiment is to have the interpolation circuit 42 between the memory 15 and the encoder 19.

Description is made as to a method of generation of the synchronizing signal cpsync which is added to the analogue video signal Senc. The synchronizing signal generator 41 generates the synchronizing signal cpsync by using the clock pulse signal clk 4 generated by the PLL circuit 13A with reference to the internal frame signal frp supplied from the PLL circuit 13A. Timings of the synchronizing signal cpsync and the internal frame signal frp are substantially identical with those of the first embodiment shown in FIG. 3.

In the synchronizing signal generator 41 of the second embodiment, The synchronizing signal cpsync is generated in a manner that the number of clock pulses of each scanning line becomes constant at all times. The synchronizing signal cpsync generated by the synchronizing signal generator 41 is applied to the readout control circuit 18, the interpolation circuit 42 and the encoder 19.

The oscillator 16 has a crystal oscillator in the same circuit, and outputs the clock pulse signal clk 3 of 27 MHz frequency having a frequency error of 30 ppm and below. The readout control circuit 18 generates the readout control signal CR on the basis of the clock pulse signal clk 3 and the synchronizing signal cpsync. The digital video signal Sout including the luminance signal Y and two color difference signals Cr and Cb is read out of the memory 15 by the readout control signal CR output from the readout control circuit 18. The digital video signal Sout is read out of the memory 15 so that readout data of the memory 15 are arranged into data arrangement of the analogue video signal Senc and further the timings between the digital video signal Sout and the analogue video signal Senc are adjusted.

The digital video signal Sout read out of the memory 15 is applied to the interpolation circuit 42.

The reason why the interpolation circuit 42 is used is described hereafter.

When the luminance signal Y and the color difference signals Cr and Cb are analogue-to-digital converted, these signals are sampled by the same clock pulse signal of 13.5 MHz. Therefore timings of sampling operation are identical. On the contrary, when the luminance signal Y and the color difference signals Cr and Cb are digital-to-analogue converted, the luminance signal Y is digital-to-analogue converted by using the clock pulse signal clk 4, and the color difference signals Cr and Cb are digital-to-analogue converted by using the clock pulse signal clk 3. The clock pulse signal clk 3 is generated by the oscillator 16, and the frequency is 27 MHz. The clock pulse signal clk 4 is generated by the PLL circuit 13A, and the frequency is 27 MHz. However, the frequency of the clock pulse signal clk 3 does not accurately coincides with the frequency of the clock pulse signal clk 4, and phases are different from each other. Therefore, a phase shift arises between the luminance signal and the color difference signal. When such video signal is reproduced by a television receiver, the video image is deteriorated. In order to prevent the deterioration of the video image, interpolation is carried out by the interpolation circuit 42.

Operation of the interpolation circuit 42 is described hereafter with reference to FIG. 7. A time difference Td between a fall edge f of the horizontal synchronizing signal Hsync and a rise edge r of the clock pulse signal clk 3 is detected with accuracy of time period T/2 (T=1/27 MHz) in the interpolation circuit 42. The luminance signal Y has luminance data $Y_1, Y_2, Y_3$ at times $t_2, t_6, t_{10}$ after time period 244T from time $t_0$, respectively. Since the color signal is output in synchronism with rise edge r of the clock pulse signal clk 3, color data $C_1, C_2, C_3$ are output at times $t_1, t_5, t_9$, respectively. Therefore, position of the luminance data Y does not coincide with position of the color data $C_1$ on a video image, because the rise edge r of the clock pulse signal clk 3 is shifted by the time period T/2 from the fall edge f of the horizontal synchronizing signal Hsync as shown in FIG. 7. In a similar manner, the luminance data $Y_2, Y_3$ do not coincide with the color data $C_2, C_3$ on the video image, respectively.

In order to render the luminance data $Y_1$ coincident with the color data $C_1$, the interpolation data is produced by the digital filter in the interpolation circuit 42 so that timing of the color data $C_1$ is moved from time $t_1$ to time $t_2$. Consequently, the timings of the luminance data Y1 and the color data $C_1$ are in coincidence with each other. Since amount of shift between the color difference signal and the horizontal synchronizing signal Hsync is time period 2T at the most, three interpolation points $I_1, I_2, I_3$ are set between time $t_1$ and time $t_5$ in the time period 2T.

The timing of the color data $C_1$ is controlled by using the interpolation data based on the detected time difference Td so that the timing of the color data $C_1$ coincides with the interpolation points $I_1, I_2$ or $I_3$. The interpolation operation is continued on the same scanning line by using the same interpolation data until next horizontal synchronizing signal Hsync is supplied. The interpolation operations are applied to the color difference signals Cr and Cb in the digital video signal Sout supplied from the memory 15. A video signal Sf obtained by interpolation in the interpolation circuit 42 is applied to the encoder 19.

In the encoder 19, the synchronizing signal cpsync is added to the luminance signal Y of the digital video signal Sf, and the color difference signals Cr and Cb are modulated into a color signal. Subsequently, the digital video signal Sf is converted to the analogue video signal Senc including the analogue luminance signal Ya and analogue color signal Ca. The video signal Senc is output to the first output terminal 20.

In the second embodiment, the interpolation points $I_1$, $I_2$, $I_3$ can be obtained on the basis of a period between respective horizontal synchronizing signals of neighboring two scanning lines. According to above, positional errors of the interpolation points $I_1$, $I_2$, $I_3$ on the scanning line can be reduced in the case that the frequency of the clock pulse signal clk 3 does not coincide with that of the clock pulse signal clk 4.

Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

What is claimed is:

1. An apparatus for producing a video signal in synchronism with an external synchronizing signal comprising:

oscillation means for oscillating a clock pulse signal which is stable in frequency, and a synchronizing signal generator for detecting the number of clock pulses representing a period of a frame signal supplied from an external apparatus by using said clock pulse signal, assigning the same number of clock pulses to each horizontal synchronization period of all digital active lines, and assigning a variable number of clock pulses to the horizontal synchronization period of at least one scanning line in a vertical blanking period on the basis of the detected number of clock pulses, wherein said synchronizing signal generator decides the number of clock pulses of one horizontal synchronizing period by deriving an average of the number of the clock pulses of plural frame periods.

2. An apparatus for producing a video signal in synchronism with an external synchronizing signal comprising:

oscillation means for oscillating a clock pulse signal being stable in frequency, a synchronizing signal generator for detecting the number of clock pulses representing a period of an external frame signal supplied from an external apparatus by using said clock pulse signal, assigning the same number of clock pulses to each horizontal synchronization period of all digital active lines, and assigning a variable number of clock pulses to the horizontal synchronization period of at least one scanning line in a vertical blanking period on the basis of the detected number of clock pulses, wherein said synchronizing signal generator decides the number of clock pulses of one horizontal synchronizing period by deriving an average of the number of the clock pulses of plural frame periods, and an encoder for converting digital color difference signals included in a digital video signal into an analogue color signal by using said clock pulse signal.

3. An apparatus for producing a video signal in synchronism with an external synchronizing signal comprising:

a memory for storing a digital video signal including a luminance signal and color difference signals, a phase-locked loop circuit for generating a first clock pulse signal synchronizing with a frame signal supplied from an external apparatus, a write control circuit for controlling said memory in order to store said digital video signal therein by using said first clock pulse signal, an oscillator for outputting a second clock pulse signal being stable in frequency, a synchronizing signal generator for detecting a period of said frame signal by using said second clock pulse signal, and generating a synchronizing signal (cpsync) so that the number of second clock pulses assigned to each digital active line becomes identical, wherein said synchronizing signal generator decides the number of clock pulses of one horizontal synchronizing period by deriving an average of the number of the clock pulses of plural frame periods, a readout control circuit for controlling said memory in order to read out said digital input video signal therefrom on the basis of said second clock pulse signal, and an encoder for converting said color difference signals supplied from said memory to a color signal by using said second clock pulse signal, and adding said synchronizing signal supplied from said synchronizing signal generator to said luminance signal supplied from said memory.

* * * * *